(12) United States Patent
Cho et al.

(10) Patent No.: US 9,161,288 B2
(45) Date of Patent: Oct. 13, 2015

(54) METHOD AND DEVICE FOR TRANSMITTING DATA THROUGH CLIENT COOPERATION IN WIRELESS COMMUNICATION SYSTEM

(75) Inventors: Hee Jeong Cho, Anyang-si (KR); Eun Jong Lee, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 160 days.

(21) Appl. No.: 14/008,502

(22) PCT Filed: Mar. 30, 2012

(86) PCT No.: PCT/KR2012/002381
§ 371 (c)(1),
(2), (4) Date: Sep. 27, 2013

(87) PCT Pub. No.: WO2012/134220
PCT Pub. Date: Oct. 4, 2012

(65) Prior Publication Data
US 2014/0112249 A1    Apr. 24, 2014

Related U.S. Application Data

(60) Provisional application No. 61/469,105, filed on Mar. 30, 2011.

(51) Int. Cl.
*H04B 7/14*    (2006.01)
*H04W 40/02*   (2009.01)
*H04W 88/04*   (2009.01)
(Continued)

(52) U.S. Cl.
CPC ............. *H04W 40/02* (2013.01); *H04L 5/0035* (2013.01); *H04W 88/04* (2013.01); *H04L 5/0044* (2013.01); *H04W 88/06* (2013.01)

(58) Field of Classification Search
CPC .. H04W 72/1215; H04W 88/06; H04W 92/04
See application file for complete search history.

(56) References Cited

U.S. PATENT DOCUMENTS 9,014,138 B2 *    4/2015   Fong et al. .................... 370/331
2007/0076649 A1 * 4/2007   Lin et al. ...................... 370/328
(Continued)

FOREIGN PATENT DOCUMENTS

KR    10-2009-0056768 A    6/2009

OTHER PUBLICATIONS

Kerstin Johnsson et al., Client Cooperation in Future Wireless Broadband Networks'A, IEEE 802.16 Broadband Wireless Access Working Group, IEEE C802.16-10/0005rl, Jan. 12, 2010.
(Continued)

*Primary Examiner* — Dang Ton
*Assistant Examiner* — Ryan Kavleski
(74) *Attorney, Agent, or Firm* — Dentons US LLP

(57)    ABSTRACT

Provided are a method and a device for transmitting data through client cooperation in a wireless communication system. A cooperative device of the client cooperation receives uplink (UL) data from a source device through a frame of a first system, and if the UL data is the data to be transmitted to a base station of the second system, transmits the UL data to the second system. In addition, when receiving downlink (DL) data from the base station of the second system, and the DL data is data to be transmitted to the source device, the DL data is transmitted to the source device through the frame of the first system.

10 Claims, 11 Drawing Sheets

(51) Int. Cl.
  *H04L 5/00* (2006.01)
  *H04W 88/06* (2009.01)

(56) References Cited

U.S. PATENT DOCUMENTS

| | | | |
|---|---|---|---|
| 2009/0016245 A1* | 1/2009 | Karls | 370/310 |
| 2009/0116430 A1* | 5/2009 | Bonta et al. | 370/329 |
| 2010/0061326 A1* | 3/2010 | Lee et al. | 370/329 |
| 2012/0113839 A1* | 5/2012 | Etemad | 370/252 |
| 2012/0127951 A1* | 5/2012 | Dhanda et al. | 370/330 |

OTHER PUBLICATIONS

Inuk Jung, "Updated text on Study Report proposed by Ad-hoc", IEEE 802.16 Broadband Wireless Access Working Group, IEEE C802.16ppc-11/0007r3, Mar. 16, 2011.

Masato Okuda, "MS Network Entry for transparent Relay Station", IEEE 802.16 Broadband Wireless Access Working Group, IEEE C802.16j-07/.001r1, Jan. 16, 2007.

* cited by examiner

FIG. 5

| Frame control | Persistent /ID | Address 1 | Address 2 | Address 3 | Sequence control | Address 4 | Sequence control | QoS control | HT control | Frame body | FCS |

METHOD AND DEVICE FOR TRANSMITTING DATA THROUGH CLIENT COOPERATION IN WIRELESS COMMUNICATION SYSTEM

This Application is a 35 U.S.C. §371 National Stage Entry of International Application No. PCT/KR2012/002381, filed Mar. 30, 2012 and claims the benefit of U.S. Provisional Application No. 61/469,105, filed Mar. 30, 2011, all of which are incorporated by reference in their entirety herein.

BACKGROUND OF THE INVENTION

1. Field of the Invention

The present invention relates to wireless communication and, more particularly, to a method and apparatus for transmitting data through client cooperation in a wireless communication system.

2. Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a client cooperation technique may be introduced in a wireless communication system. The client cooperation technique refers to a technique by which a specific device helps transmission of another device. That is, one device may directly communicate with a base station (BS) or may indirectly communication with the BS by the aid of another device. The client cooperation technique has an effect of lower power consumption, throughput enhancement, etc.

The client cooperation technique can be more effectively used in a multi-radio access technology (RAT) device. The multi-RAT device refers to a device that can operate in a plurality of communication systems. For example, the multi-RAT device can operate both in institute of electrical and electronics engineers (IEEE) 802.16m and IEEE 802.11. To provide an easiness access to the BS anytime anywhere and to maintain effective performance, the multi-RAT device can use a multi-RAT client cooperation technique (i.e., improved tethering) in a heterogeneous network. The multi-RAT device may perform procedures for performing the multi-RAT client cooperation technique autonomously without aid of the base station.

It is necessary to newly propose a method of transmitting data in which a multi-RAT device communicates with a BS using client cooperation technology.

SUMMARY OF THE INVENTION

The present invention provides a method and apparatus for transmitting data through client cooperation in a wireless communication system. The present invention provides a method in which a source device for client cooperation transmits UL data and receives DL data through a cooperative device for client cooperation.

In an aspect, a method of transmitting, by a cooperative device, data through client cooperation in a wireless communication system is provided. The method includes receiving uplink (UL) data from a source device through a frame of a first system, determining whether or not the received UL data is data to be transmitted to a base station of a second system, and transmitting the UL data to the base station of the second system if the UL data is data to be transmitted to the base station of the second system.

The first system may be an institute of electrical and electronics engineers (IEEE) 802.11.

If the UL data is data to be transmitted to the base station of the second system, a value of a destination address field of the frame of the first system may be set as a value of an identifier of the base station of the second system.

If the UL data is data to be transmitted to the base station of the second system, a value of a destination address field of the frame of the first system may be set as a predetermined value.

UL resource assignment for UL resources used to transmit the UL data to the base station of the second system may be based on an identifier of the cooperative device.

The method may further include transmitting an ID of the source device, together with the UL data, to the base station of the second system.

UL resource assignment for UL resources used to transmit the UL data to the base station of the second system may be based on an identifier newly assigned by the base station of the second system for client cooperation.

UL resource assignment for UL resources used to transmit the UL data to the base station of the second system may be based on an identifier of the source device.

In another aspect, a method of transmitting, by a cooperative device, data through client cooperation in a wireless communication system is provided. The method includes receiving downlink (DL) data from a base station of a second system, determining whether or not the received DL data is data to be transmitted to a source device, and transmitting the DL data to the source device through a frame of a first system if the DL data is data to be transmitted to the source device.

The first system may be an institute of electrical and electronics engineers (IEEE) 802.11.

DL resource assignment for DL resources used to receive the DL data from the base station of the second system may be based on an identifier of the cooperative device.

The method may further include transmitting an identifier of the source device, together with the DL data, to the source device.

DL resource assignment for DL resources used to receive the DL data from the base station of the second system may be based on an identifier newly assigned by the base station of the second system for client cooperation.

DL resource assignment for DL resources used to receive the DL data from the base station of the second system may be based on an identifier of the source device.

If the DL data is data to be transmitted to the source device, a value of a source address field of the frame of the first system may be set as a value of an identifier of the base station of the second system, or a value of a source address field of the frame of the first system may be pre-defined.

A BS and a multi-RAT device can efficiently communicate with each other through client cooperation technology.

BRIEF DESCRIPTION OF THE DRAWINGS

FIG. 5 shows an example of a frame structure of IEEE 802.11.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m and IEEE 802.11 are chiefly described as an example in order to clarify the description, but the technical spirit of the present invention is not limited to IEEE 802.16m and IEEE 802.11.

Figure 1:
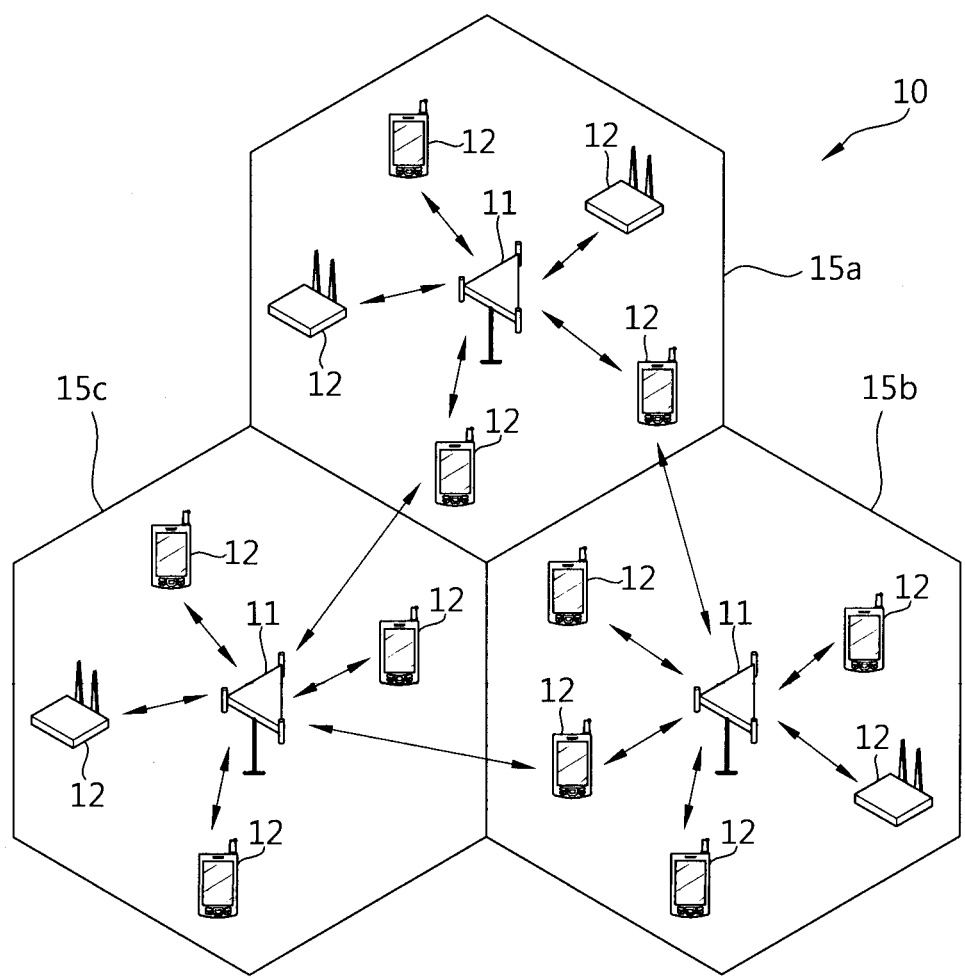
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
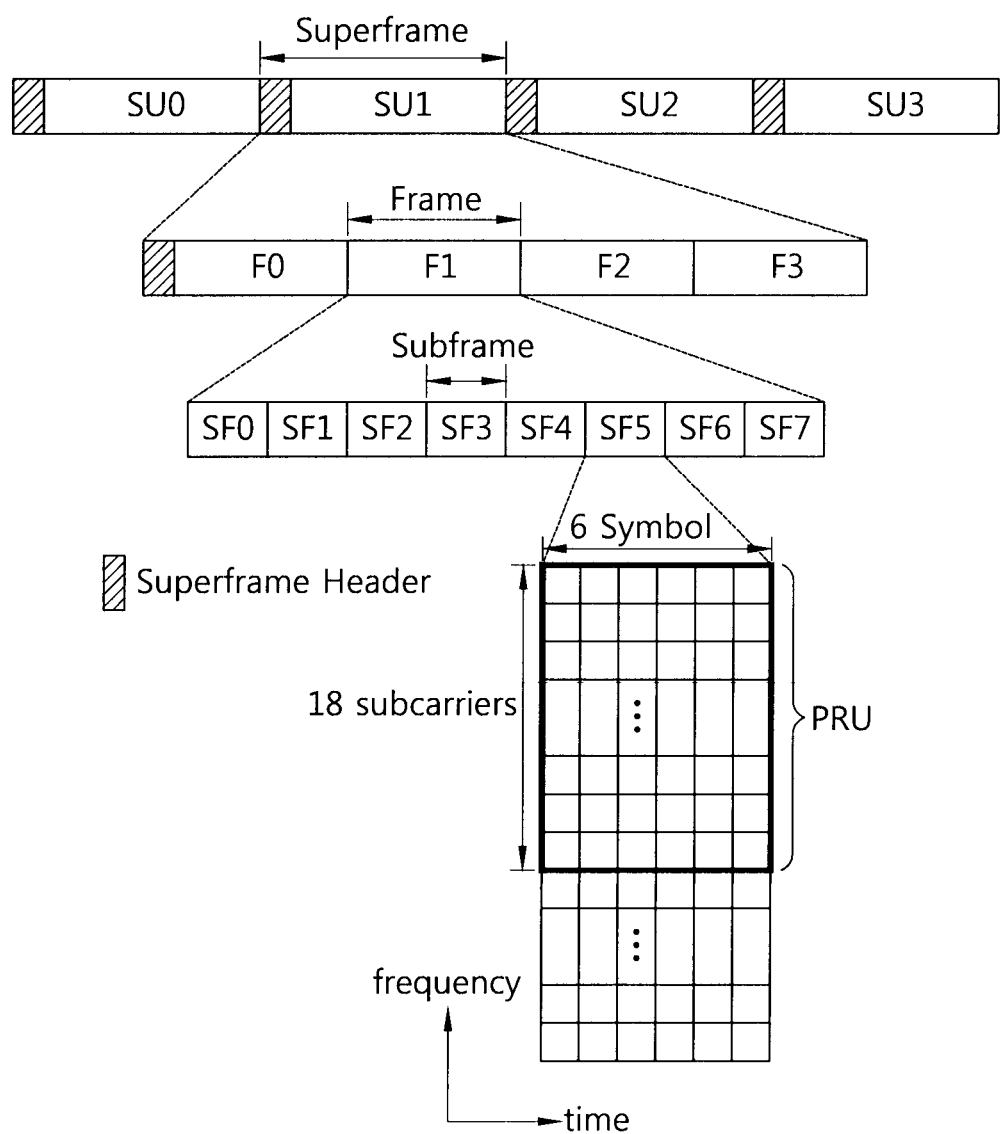
FIG. 2 shows an example of a frame structure of IEEE 802.16m.

FIG. 2 shows an example of a frame structure of IEEE 802.16m.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | | 5 | 7 | 8.75 | 10 | 20 |
|---|---|---|---|---|---|---|
| Sampling factor, n | | 28/25 | 8/7 | 8/7 | 28/25 | 28/25 |
| Sampling frequency, $F_s$(MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$(kHz) | | 10.94 | 7.81 | 9.77 | 10.94 | 10.94 |
| Useful symbol time, $T_b$(μs) | | 91.4 | 128 | 102.4 | 91.4 | 91.4 |
| G = 1/8 | Symbol time, $T_s$(μs) | 102.857 | 144 | 115.2 | 102.857 | 102.857 |
| | FDD Number of ODFMA symbols per 5 ms frame | 48 | 34 | 43 | 48 | 48 |
| | Idle time(μs) | 62.857 | 104 | 46.40 | 62.857 | 62.857 |
| | TDD Number of ODFMA symbols per 5 ms frame | 47 | 33 | 42 | 47 | 47 |
| | TTG + RTG(μs) | 165.714 | 248 | 161.6 | 165.714 | 165.714 |
| G = 1/16 | Symbol time, $T_s$(μs) | 97.143 | 136 | 108.8 | 97.143 | 97.143 |
| | FDD Number of ODFMA symbols per 5 ms frame | 51 | 36 | 45 | 51 | 51 |
| | Idle time(μs) | 45.71 | 104 | 104 | 45.71 | 45.71 |
| | TDD Number of ODFMA symbols per 5 ms frame | 50 | 35 | 44 | 50 | 50 |
| | TTG + RTG(μs) | 142.853 | 240 | 212.8 | 142.853 | 142.853 |
| G = 1/4 | Symbol time, $T_s$(μs) | 114.286 | 160 | 128 | 114.286 | 114.286 |
| | FDD Number of ODFMA symbols per 5 ms frame | 43 | 31 | 39 | 43 | 43 |
| | Idle time(μs) | 85.694 | 40 | 8 | 85.694 | 85.694 |
| | TDD Number of ODFMA symbols per 5 ms frame | 42 | 30 | 38 | 42 | 42 |
| | TTG + RTG(μs) | 199.98 | 200 | 136 | 199.98 | 199.98 |
| Number of Guard subcarriers | Left | 40 | 80 | 80 | 80 | 160 |
| | Right | 39 | 79 | 79 | 79 | 159 |
| Number of used subcarriers | | 433 | 865 | 865 | 865 | 1729 |
| Number of PRU in type-1 subframe | | 24 | 48 | 48 | 48 | 96 |

In Table 1, $N_{FFT}$ denotes a smallest power of 2 greater than $N_{used}$. A sampling factor is defined as $F_s=\text{floor}(n \cdot BW/8000) \times 8000$. A subcarrier spacing is defined as $\Delta f = F_s/NFFT$. A useful symbol time is defined as $T_b=1/\Delta f$. A CP time is defined as $T_g = G \cdot T_b$. An OFDMA symbol time is defined as $T_s = T_b + T_g$. A sampling time is defined as $T_b/N_{FFT}$.

Figure 3:
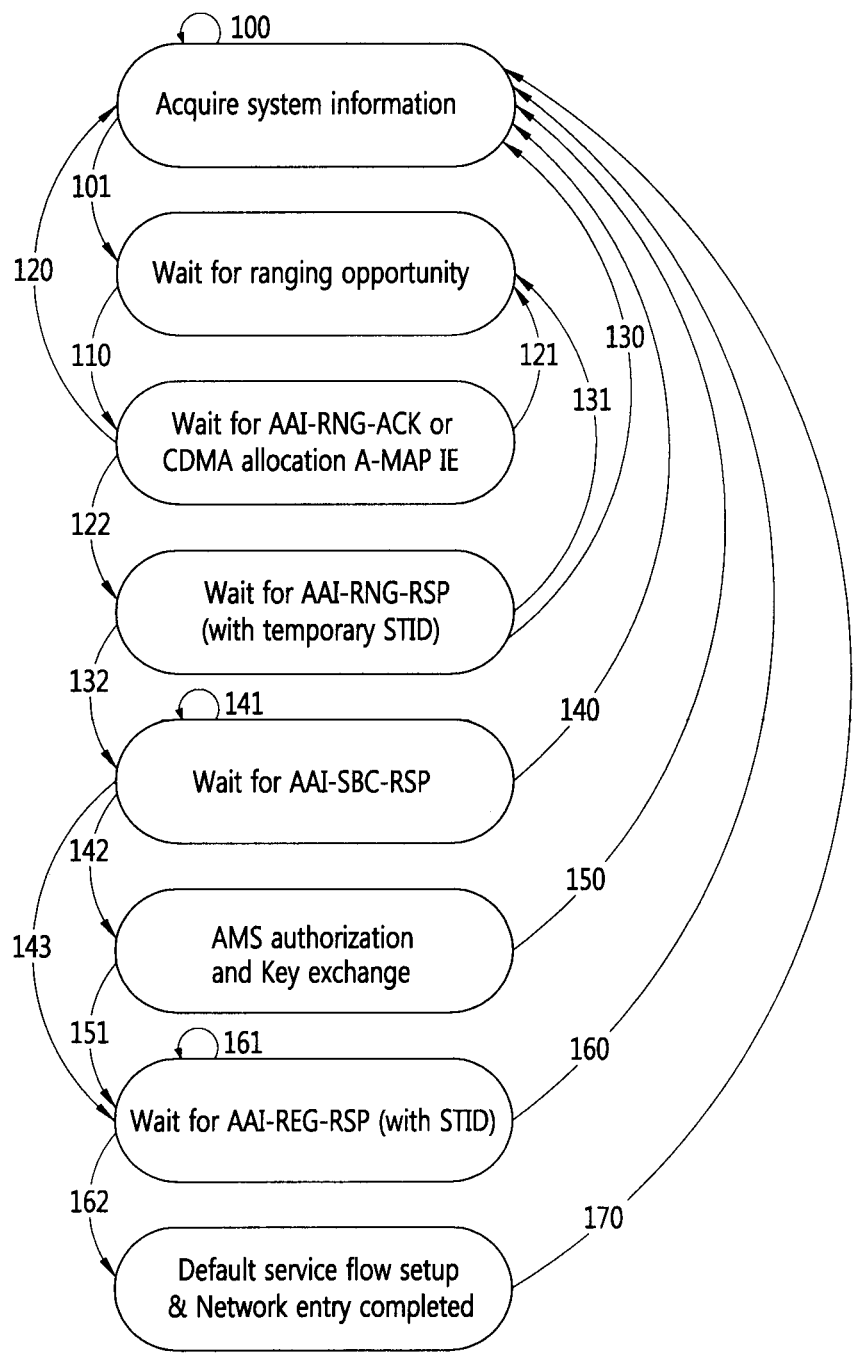
FIG. 3 shows an example of a state machine of a UE in an initial network entry process in IEEE 802.16m.

FIG. 3 shows an example of a state machine of a UE in an initial network entry process in IEEE 802.16m.

First, the UE acquires system information. If set DL synchronization, received DL and UL parameters, and a network are not selected (100), system information is acquired again. If set DL synchronization, received DL and UL parameters, and a network are selected (101), the UE waits for a ranging opportunity. When a ranging opportunity is obtained (110), the UE transmits an initial ranging code.

The UE waits for an AAI-RNG-ACK message or a CDMA allocation A-MAP information element (IE). If a timer T3 or T31 has expired or an AAI-RNG-ACK message in a state "not detected" is received and a retry opportunity has expired or an AAI-RNG-ACK message in a state "abort" is received (120), the UE acquires system information again. Alternatively, if an AAI-RNG-ACK message in a state "continue" or "not detected" is received or a timer T3 or T31 has expired and a retry opportunity remains (121), the UE waits for a ranging opportunity. When a CDMA allocation A-MAP IE is received (122), the UE transmits an AAI-RNG-REQ message.

After transmitting the AAI-RNG-REQ message, the UE waits for an AAI-RNG-RSP message with a temporary station identifier (STID). If the timer T3 has expired and the retry opportunity has been exhausted or an AAI-RNG-RSP message in a state "abort" is received (130), the UE acquires system information again. If the timer T3 has expired and the retry opportunity still remains (131), the UE waits for a ranging opportunity. When an AAI-RNG-RSP message with an STID of a state "success" is received (132), the UE transmits an AAI-SBC-REQ message.

After transmitting the AAI-SBC-REQ message, the UE waits for an AAI-SBC-RSP message. If a timer T18 has expired and the retry opportunity has been exhausted or an AAI-RNG-RSP message in a state "abort" is received (140), the UE acquires system information again. If the timer T18 has expired and the retry opportunity remains (141), the UE transmits an AAI-SBC-REQ message. If an AAI-SBC-RSP message is received and authorization is supported (142), UE authorization and a key exchange are performed. Here, if a timer T17 has expired and the retry opportunity has been exhausted or the AAI-RNG-RSP message in a state "abort" is received (150), the UE acquires system information again. If the UE is authorized (151), the UE transmits an AAI-REG-REQ message. If an AAI-SBC-RSP message is received and authorization is not supported (143), the UE transmits an AAI-REG-REQ message.

The UE that has transmitted the AAI-REG-REQ message waits for an AAI-REG-RSP message with an STID. Here, if a timer T6 has expired and the retry opportunity has been exhausted or an AAI-RNG-RSP message or an AAI-RES-CMD message in a state "abort" is received (160), the UE acquires system information again. If the timer T6 has expired and the retry opportunity remains (161), the UE transmits an AAI-SBC-REQ message. When an AAI-REG-RSP message is received (162), the UE processes the AAI-REG-RSP message.

A basic service flow is configured and network entry is completed through the above process. Here, when the AAI-RNG-RSP message, the AAI-DREG-RSP message, or the AAI-RES-CMD message in a state "abort" is received (170), the UE acquires system information again.

Figure 4:
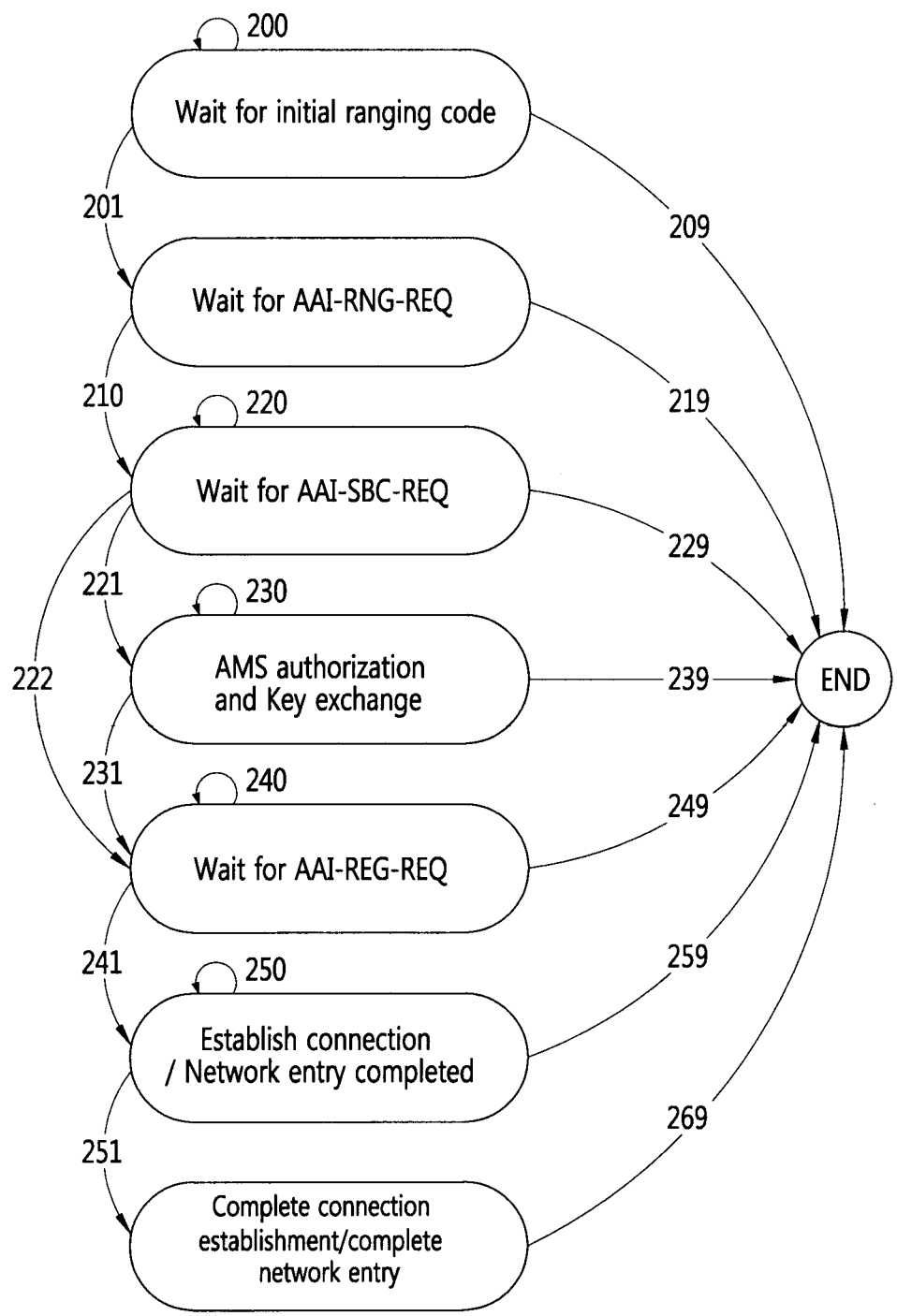
FIG. 4 shows an example of a state machine of a BS in an initial network entry process in IEEE 802.16m.

FIG. 4 shows an example of a state machine of a BS in an initial network entry process in IEEE 802.16m.

The BS waits for an initial ranging code. The BS receives the initial ranging code and transmits an AAI-RNG-ACK message in a state "continue" (200). Alternatively, the BS receives the initial ranging code and transmits an AAI-RNG-ACK message in a state "success" and a CDMA allocation A-MAP IE (201). Alternatively, the BS receives the initial ranging code and transmits an AAI-RNG-ACK message in a state "abort" (209). Here, an initial network entry process is terminated.

After transmitting the AAI-RNG-ACK message in a state "success" and the CDMA allocation A-MAP IE, the BS waits for an AAI-RNG-REQ message. The BS receives an AAI-RNG-REQ message and transmits an AAI-RNG-RSP message in a state "success" with a temporary STID (210). Alternatively, if a ranging response processing time has expired (219), the initial network entry process is terminated.

After transmitting the AAI-RNG-RSP message in a state "success" with a temporary STID, the BS waits for an AAI-SBC-REQ message. In this process, the BS may receive the AAI-RNG-REQ message again and transmit the AAI-RNG-RSP message again (220). If the AAI-SBC-REQ message is received and UE authorization is supported (221), the BS performs UE authorization and a key exchange. In this process, the BS may receive the AAI-SBC-REQ message again and transmit the AAI-SBC-RSP message again (230). If the UE is authorized (231), the BS waits for an AAI-REG-REQ message. Alternatively, the BS may terminate the initial network entry process by transmitting an AAI-RNG-RSP message in a state "abort" (229 and 239). If the AAI-SBC-REQ message is received and UE authorization is not supported (222), the BS waits for an AAI-REG-REQ message.

If UE authorization is not supported while waiting for the AAI-REG-REQ message, the BS may receive the AAI-SBC-REQ message again and transmit the AAI-SBC-RSP message again (240). When the AAI-REG-REG message is received, the BS transmits an AAI-REG-RSP message with an STID (241). Alternatively, the BS may terminate the initial network entry process by transmitting an AAI-RNG-RSP message in a state "abort" or an AAI-RES-CMD message (249).

After transmitting the AAI-REG-RSP message with an STID, the BS waits for acknowledgement (ACK) for the AAI-REG-RSP message. In this process, the BS may receive the AAI-REG-REQ message again and transmit the AAI-REG-RSP message with an STID again (250). When implicit or explicit ACK for the AAI-REG-RSP message is received (251), a connection is set up and the initial network entry is completed. Alternatively, the BS may terminate the initial network entry process by transmitting an AAI-RNG-RSP message, an AAI-RES-CMD message, or an AAI-DREG-RSP message in a state "abort" (259, 269).

FIG. 5 shows an example of a frame structure of IEEE 802.11.

A frame of IEEE 802.11 includes a set of fields in a fixed order. Referring to FIG. 5, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A deauthentication frame is used to finish an authentication relation. An association request frame is transmitted so that the mobile station participates in the network when the mobile station recognizes the compatible network and is authenticated. An association response frame is a response for the association request frame. A deassociation frame is used to finish an association relation.

Three states may exist according to an authentication and association procedure in IEEE 802.11. Table 2 below shows the three states of IEEE 802.11.

TABLE 2

|  | Authentication | Association |
|---|---|---|
| State 1 | X | X |
| State 2 | O | X |
| State 3 | O | O |

To transmit a data frame, a device must perform the authentication and association procedure with respect to a network. In Table 2, a procedure of transitioning from the state 1 to the state 2 can be called the authentication procedure. The authentication procedure can be performed in such a manner that one device acquires information of a different device and authenticates the different device. The information of the different device can be acquired by using two methods, i.e., a passive scanning method for acquiring information of a different node by receiving a beacon frame and an active scanning method for acquiring the information of the different device by transmitting a probe request message and receiving a probe response message received in response thereto. The authentication procedure can be complete by exchanging an authentication request frame and an authentication response frame.

In Table 2, a procedure of transitioning from the state 2 to the state 3 can be called the association procedure. The association procedure can be complete when two devices exchange the association request frame and the association response frame upon completion of the authentication procedure. An association ID can be allocated by the association procedure.

A client cooperation technique may be introduced in a wireless communication system. One device may directly communicate with a base station (BS) or may indirectly communication with the BS by the aid of another device. Hereinafter, a source device refers to a device which communicates with the BS through a connection with another device. A cooperative device refers to a relay entity which helps the source device to communicate with the BS. The client cooperation technique has an effect of lower power consumption. In terms of a device, a path-loss can be decreased by the client cooperation technique, thereby being able to decrease transmit power. In terms of a network, total network power consumption can be decreased. In addition, the client cooperation technique has an effect of throughput enhancement. In terms of a device, a source device can use a good-quality link between a cooperative device and a BS and between BSs. In addition, an antenna extension gain can be obtained. In terms of the network, network capacity can be increased by using client clustering based on frequency reuse without an additional infrastructure.

Figure 6:
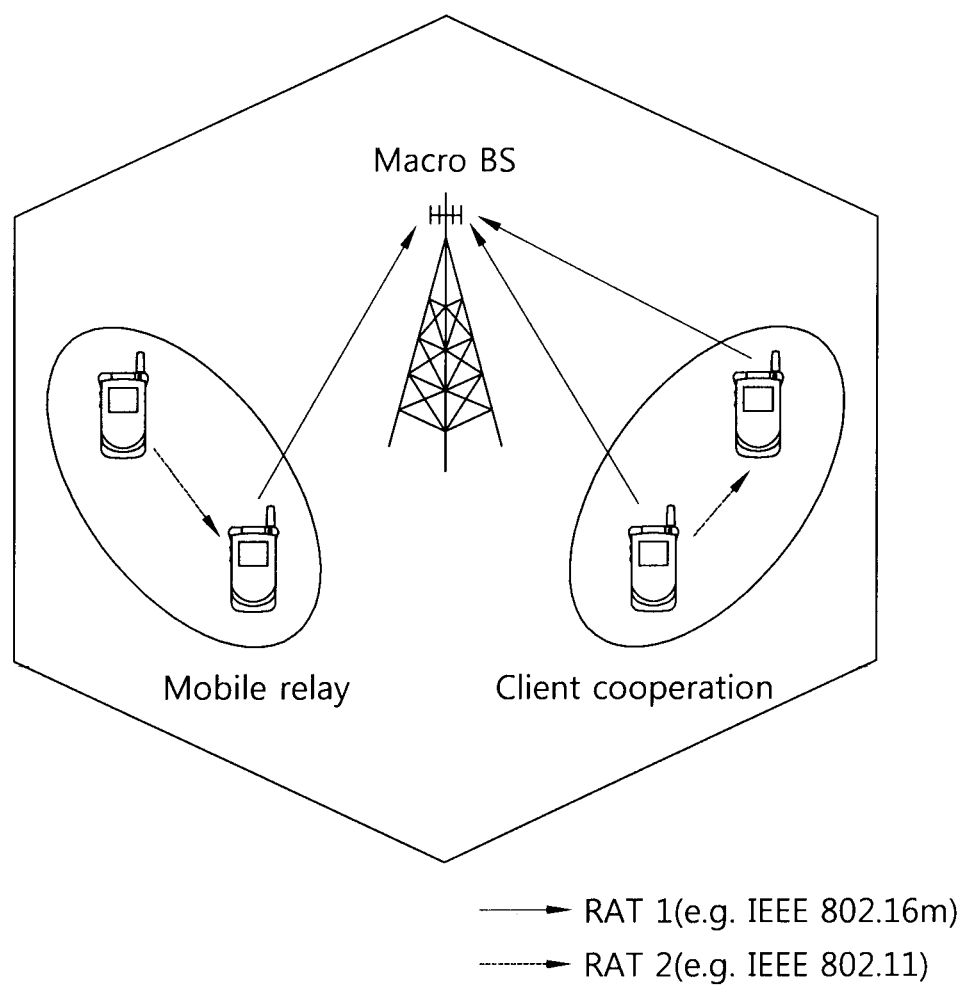
FIG. 6 shows an example of implementing a client cooperation technique.

FIG. 6 shows an example of implementing a client cooperation technique.

Referring to FIG. 6, in the client cooperation technique, a source device can directly communicate with a macro BS, or can communicate with the macro BS via a cooperative device. The cooperative device may directly communicate with the macro BS, or can help communication of the source device. This is different from a mobile relay in a sense that the source device can directly communicate with the macro BS. In this case, each device and the macro BS can communicate by using a first radio access technology (RAT), and the source device and the cooperative device can communicate by using a second RAT. The first RAT may be a radio technology such as IEEE 802.16 (WiMAX), IEEE 802.16m or IEEE 802.20, etc. Alternatively, the first RAT may be a radio technology such as E-UTRA, 3GPP LTE or 3GPP LTE-A, etc. The second RAT may be IEEE 802.11.

Figure 7:
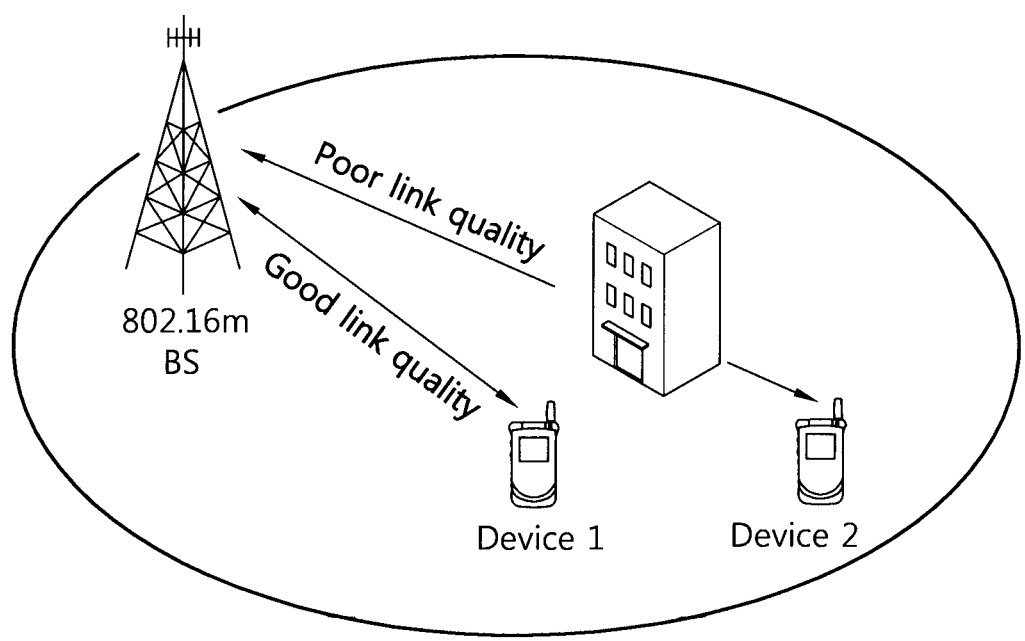
FIG. 7 shows another example of implementing a client cooperation technique.

FIG. 7 shows another example of implementing a client cooperation technique.

The client cooperation technique can be more effectively used in a multi-RAT device. The multi-RAT device refers to a device that can operate in a plurality of communication systems. For example, the multi-RAT device can operate both in IEEE 802.16m and IEEE 802.11. When the multi-RAT device uses the client cooperation technique, the multi-RAT device can communicate with an IEEE 802.16m BS by using a plurality of RATs. For example, as shown in FIG. 7, if channel quality is poor between a second device and a BS or if the second device located in a shadow area cannot receive a signal from the BS, the first device can be used as a cooperative device to communicate with the BS. In this case, each device and the BS can communicate by using the first RAT, and the source device and the cooperative device can communicate by using the second RAT. The first RAT may be a radio technique such as IEEE 802.16, IEEE 802.16m, IEEE 802.20, E-UTRA, 3GPP LTE or 3GPP LTE-A, etc. The second RAT may be IEEE 802.11.

Figure 8:
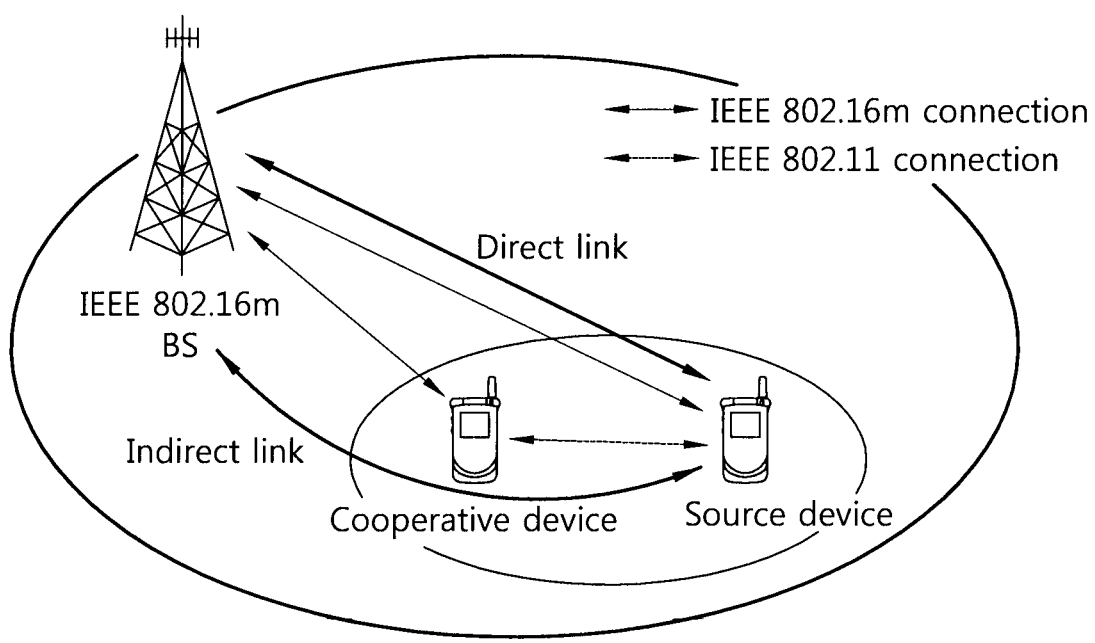
FIG. 8 shows another example of implementing a client cooperation technique.

FIG. 8 shows another example of implementing a client cooperation technique.

A source device and a macro BS (e.g., IEEE 802.16m BS) can be connected through a direct link, and can be connected through an indirect link by using a cooperative device. In this case, each device and the BS can be connected by using IEEE 802.16m, and the source device and the cooperative device can be connected by using IEEE 802.11.

A source device can communicate with a BS after performing network entry into the BS. When the source device performs the network entry into the BS, the source device can perform the network entry into the BS by transmitting various types of messages for the network entry to the BS through a cooperative device. For example, the source device can access an IEEE 802.16m BS through the cooperative device connected through IEEE 802.11. A method of the source device performing network entry into the BS through the cooperative device can be divided into two methods.

1) First, the source device may attempt network entry into the IEEE 802.16m BS without obtaining information for performing multi-RAT client cooperation (hereinafter called client cooperation) from a counterpart device. That is, there may be proposed a method in which the source device completes authentication and association procedures with the counterpart device and performs network entry into the IEEE 802.16m BS in the state in which the source device is unaware of whether or not the counterpart device can function as a cooperative device. Here, the counterpart device cannot be called a cooperative device because the counterpart device cannot function as a cooperative device in client cooperation. The counterpart device can be called a cooperative device after whether or not the counterpart device can function as a cooperative device is checked.

The source device encapsulates a ranging request (RNG-REQ) message into the frame body field of an IEEE 802.11 frame and transmits the RNG-REQ message to the counterpart device. The counterpart device can transmit an acknowledgement (ACK) message for the RNG-REQ message to the source device. If the counterpart device can function as a cooperative device for own client cooperation, the counterpart device can transmit the ACK message to the source device. That is, the counterpart device can be permitted to function as a cooperative device for client cooperation by means of the ACK message. Accordingly, the counterpart device can become a cooperative device for client cooperation, and the source device can become a source device for client cooperation.

The counterpart device transfers the RNG-REQ message to the BS using a common ranging procedure or a common bandwidth request procedure. In response to the RNG-REQ message, the BS transmits a ranging response (RNG-RSP) message to the counterpart device. The counterpart device encapsulates the RNG-RSP message into the frame body field of an IEEE 802.11 frame and transmits the encapsulated RNG-RSP message to the source device. The source device can be aware that the counterpart device functions as a cooperative device for client cooperation by receiving the RNG-RSP message for the transmitted RNG-REQ message. Accordingly, the counterpart device can become a cooperative device for client cooperation, and the source device can become a source device for client cooperation.

2) After obtaining information for performing multi-RAT client cooperation from the cooperative device, the source device can attempt network entry into the IEEE 802.16m BS. That is, there may be proposed a method of the source device performing network entry into the IEEE 802.16m BS after completing authentication and association procedures with a cooperative device. A method of the source device obtaining information for performing multi-RAT client cooperation from the cooperative device is described later.

The source device encapsulates the RNG-REQ message into the frame body field of an IEEE 802.11 frame and transmits the RNG-REQ message to the counterpart device. The cooperative device can be implicitly aware that a received message is the RNG-REQ message because it already functions as a cooperative device for client cooperation. The cooperative device is assigned with UL resources by transmitting a ranging code to the BS according to a common ranging procedure and transmitting a bandwidth request (BR) to the BS according to a common bandwidth request procedure. The cooperative device transmits the RNG-REQ message to the BS through the assigned UL resources.

In response to the RNG-REQ message, the BS transmits a RNG-RSP message to the cooperative device. The BS can transmit DL resource assignment information using an ID of the cooperative device and the RNG-RSP message to the cooperative device. Here, the BS can include a new ID used in client cooperation or an ID assigned to the source device in a header, an extended header, or the RNG-RSP message and can transmit the header or the RNG-RSP message. The cooperative device encapsulates the RNG-RSP message into the frame body field of an IEEE 802.11 frame and transmits the encapsulated RNG-RSP message to the source device.

Before the source device obtains information for performing multi-RAT client cooperation from the cooperative device, whether or not the counterpart device can operate as a cooperative device can be determined. The counterpart device can autonomously determine whether it can operate as a cooperative device by taking several determination factors, such as its own moving speed and location, the presence and the number of surrounding devices that may become cooperative devices, the amount of power consumption, and a channel status with the BS, into consideration. Alternatively, the BS can determine whether or not the counterpart device can operate as a cooperative device. If the BS determines that the counterpart device can operate a cooperative device and requests the counterpart device to operate as a cooperative device for client cooperation, the counterpart device can approve or deny the request of the BS. Whether or not the counterpart device can operate as a cooperative device for client cooperation can be broadcasted to a plurality of devices at the same time or can be transferred to a specific device in a unicast way.

The source device can obtain information for performing client cooperation from the cooperative device. The information for performing client cooperation can include whether or not the counterpart device is a multi-RAT device, the type of system to which each device is connected, whether or not the counterpart device can operate as a cooperative device in client cooperation, information related to a network service provider (NSP), and system information about a BS to which the counterpart device is connected.

After whether or not the counterpart device can operate as a cooperative device in client cooperation is determined, the counterpart device and the source device can exchange pieces of information for performing client cooperation with each other. In an authentication or association procedure with the source device or association is completed, the counterpart device can transmit pieces of information for performing client cooperation to the source device in the form of one frame at the same time. Here, the frame in which the pieces of information for performing client cooperation are transmitted can be a management frame, such as a beacon frame, a probe response frame, an authentication response frame, or association response frame, or a data frame. Alternatively, in an authentication or association procedure with the source device or association is completed, the counterpart device can transmit information for performing client cooperation to the source device through a plurality of frames. If a first device is not a multi-RAT device or it cannot operate as a cooperative device for client cooperation, the remaining pieces of information may not be transmitted to a second device. The source device can determine whether the performing of client cooperation with the counterpart device is appropriate or not and search for another device if it is determined that the performing of client cooperation with the counterpart device is not appropriate. If the source device determines that the performing of client cooperation with the counterpart device is appropriate, the source device can start network entry into the BS.

A method in which a source device transmits an UL message or data to a BS using a cooperative device and the BS transmits a DL message or data to the source device when the configuration of client cooperation between the source device and the cooperative device, and the BS is completed is described below. The present invention can be applied to a case where a source device performs network entry into a BS through a cooperative device or a case where a source device communicates with a BS through a cooperative device after performing network entry into the BS. A source device can exchange messages or data with a first RAT BS through a second RAT connection with a cooperative device. Hereinafter, the first RAT is assumed to be IEEE 802.16m, but the present invention is not limited thereto. The first RAT can be various radio techniques, such as IEEE 802.20, E-UTRA, 3GPP LTE, or 3GPP LTE-A. The second RAT is assumed to be IEEE 802.11.

First, a method in which a source device transmits an UL message or data to a BS through an indirect link between the BS and the source device is described according to an embodiment of the present invention.

Figure 9:
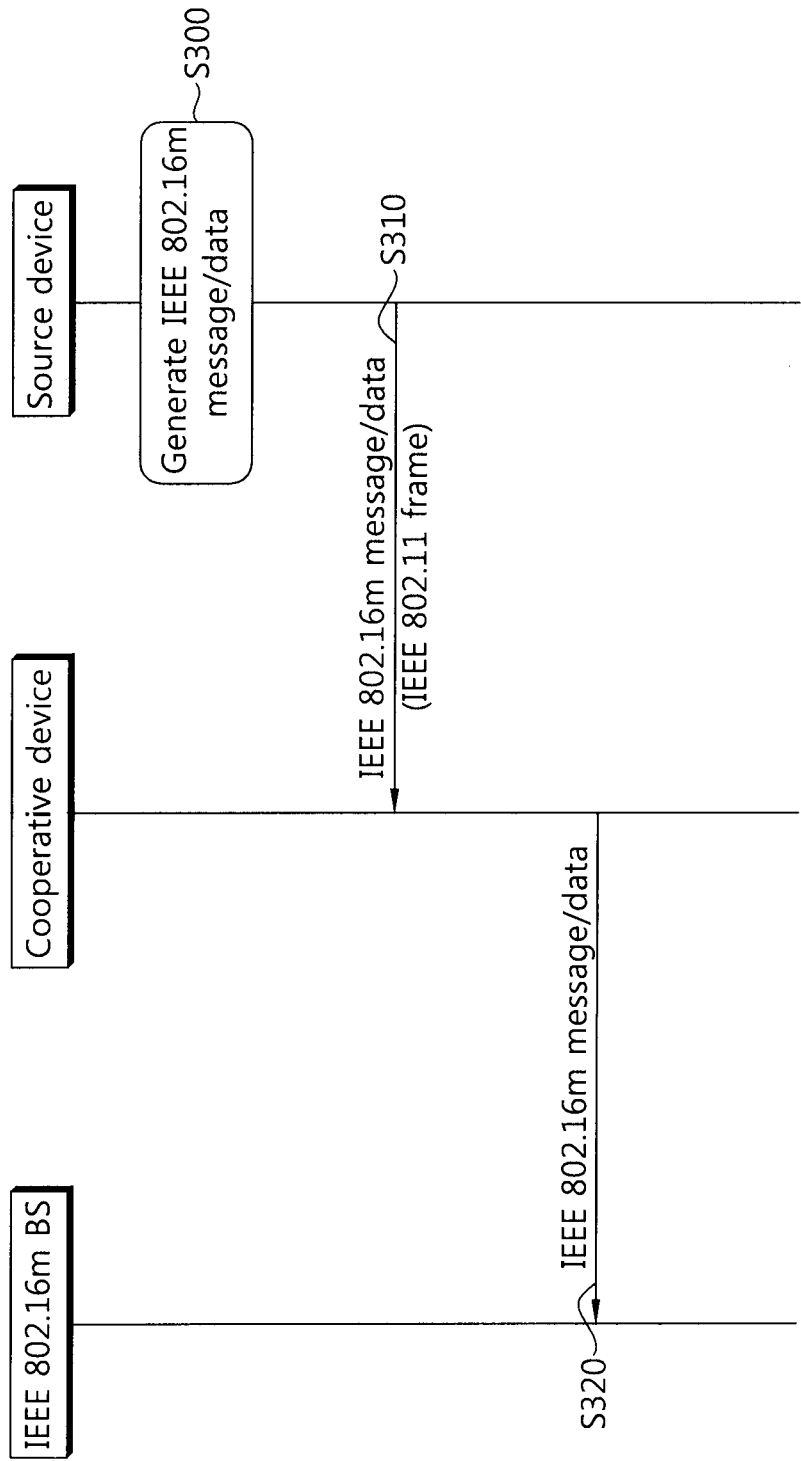
FIG. 9 shows an embodiment of a proposed method of transmitting data.

FIG. 9 shows an embodiment of a proposed method of transmitting data.

At step S300, a source device generates an IEEE 802.16m message/data. At step S310, the source device carries the generated IEEE 802.16m message/data on the frame body field of an IEEE 802.11 frame and transmits the IEEE 802.11 frame to a cooperative device. Here, the source device needs to inform the cooperative device that the transmitted IEEE 802.16m message/data is transmitted to an IEEE 802.16m BS not to the cooperative device. To this end, the destination address field of the IEEE 802.11 frame on which the IEEE 802.16m message/data is carried can be set as an ID of the IEEE 802.16m BS. Alternatively, the destination address field of the IEEE 802.11 frame can be set as a predetermined value indicating the IEEE 802.16m BS.

The cooperative device determines whether or not the received IEEE 802.11 frame is a frame that must be transmitted to the IEEE 802.16m BS based on the destination address field of the received IEEE 802.11 frame. The cooperative device can be aware that a corresponding IEEE 802.11 frame has been transmitted by which device based on the source address field of the IEEE 802.11 frame. If the destination address field of the received IEEE frame is set as an ID of the IEEE 802.16m BS, the cooperative device can be aware that the received IEEE 802.11 frame is a frame that must be transmitted to the IEEE 802.16m BS. Alternatively, if the destination address field of the received IEEE frame is set as a predetermined value, the cooperative device can be aware that the received IEEE 802.11 frame is a frame that must be transmitted to the IEEE 802.16m BS. If the received IEEE 802.11 frame is a frame that must be transmitted to the IEEE 802.16m BS, the cooperative device transmits the IEEE 802.16m message/data carried on the frame body field of the IEEE 802.11 frame to the IEEE 802.16m BS at step S320.

When the cooperative device transmits the IEEE 802.16m message/data to the IEEE 802.16m BS, it is necessary for the cooperative device to inform that the corresponding IEEE 802.16m message/data is a message/data that has been actually transmitted by which device. To this end, the cooperative device can use various IDs when it requests UL resources through which the IEEE 802.16m message/data will be transmitted from the IEEE 802.16m BS. For example, an ID of the cooperative device can be used. If the ID of the cooperative device is used, the UL resource assignment A-MAP IE of an IEEE 802.16m system can be masked to the ID of the cooperative device. Here, an ID of the source device, together with the IEEE 802.16m message/data, can be transmitted to the IEEE 802.16m BS. Alternatively, an ID newly assigned by the BS for client cooperation can be used. If the newly assigned ID is used for client cooperation, the UL resource assignment A-MAP IE of an IEEE 802.16m system can be masked to the ID newly assigned by the BS for client cooperation. Here, an ID of the source device, together with the IEEE 802.16m message/data, can be transmitted to the IEEE 802.16m BS. The number of newly assigned IDs for client cooperation can be one in each cooperative device, and the number of source devices communicating with an IEEE 802.16m BS using the cooperative device can be several. That is, it means that the number of IDs of a source device mapped to the newly assigned ID for the client cooperation of a corresponding cooperative device is several. Alternatively, an ID of the source device can be used. If the ID of the source device is used, the UL resource assignment A-MAP IE of an IEEE 802.16m system can be masked to the ID of the source device.

A method in which a BS transmits a DL message or data to a source device through an indirect link between the BS and the source device is described below according to an embodiment of the present invention.

Figure 10:
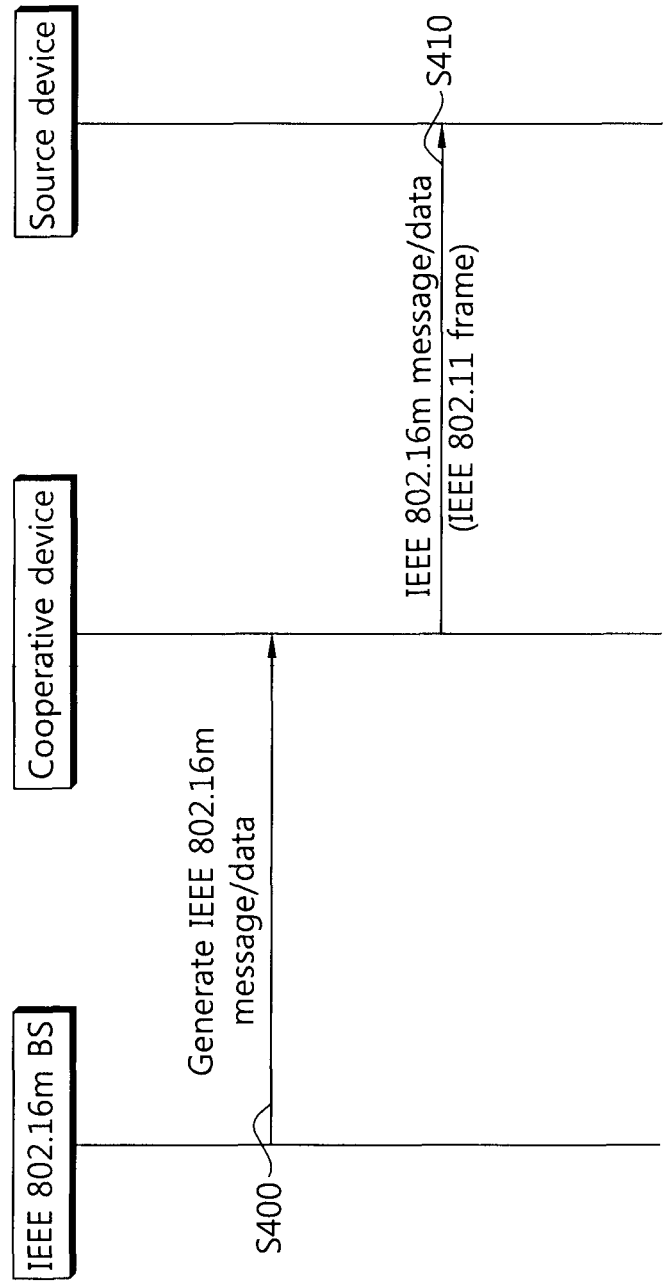
FIG. 10 shows an embodiment of a proposed method of transmitting data.

FIG. 10 shows an embodiment of a proposed method of transmitting data.

At step S400, an IEEE 802.16m BS transmit a message/data to a cooperative device. When the IEEE 802.16m BS transmits the message/data to the cooperative device, it is necessary for the IEEE 802.16m BS to inform that the corresponding message/data is a message/data that must be actually transmitted to any one of the cooperative device and a source device. To this end, the IEEE 802.16m BS can use various IDs when allocating DL resources through which the message/data will be transmitted to the cooperative device. For example, an ID of the cooperative device can be used. If the ID of the cooperative device is used, the DL resource assignment A-MAP IE of an IEEE 802.16m system can be masked to the ID of the cooperative device. Here, the ID of the source device, together with the message/data, can be transmitted to the cooperative device. Alternatively, an ID newly assigned to the cooperative device for client cooperation can be used. The DL resource assignment A-MAP IE of the IEEE 802.16m system can be masked to the ID newly assigned to the cooperative device for client cooperation. Here, the ID of the source device, together with the message/data, can be transmitted to the cooperative device. The number of newly assigned IDs for client cooperation can be one in each cooperative device, and the number of source devices communicating with an IEEE 802.16m BS using the cooperative device can be several. That is, it means that the number of IDs of a source device mapped to the newly assigned ID for the client cooperation of a corresponding cooperative device is several. Alternatively, an ID of the source device can be used. If the ID of the source device is used, the UL resource assignment A-MAP IE of an IEEE 802.16m system can be masked to the ID of the source device. By using various IDs as described above, the cooperative device can be aware that the message/data received from the IEEE 802.16m BS is a message/data that must be transmitted which device.

At step S410, the cooperative device carries the message/data received from the IEEE 802.16m BS on the frame body field of an IEEE 802.11 frame and transmits the IEEE 802.11 frame to the source device. Here, it is necessary for the cooperative device to inform the source device that the transmitted message/data has been received from the IEEE 802.16m BS not from the cooperative device. To this end, the source address field of the IEEE 802.11 frame on which the message/data is carried can be set as an ID of the IEEE 802.16m BS. Alternatively, the source address field of the IEEE 802.11 frame can be set as a predetermined value indicating the IEEE 802.16m BS.

Figure 11:
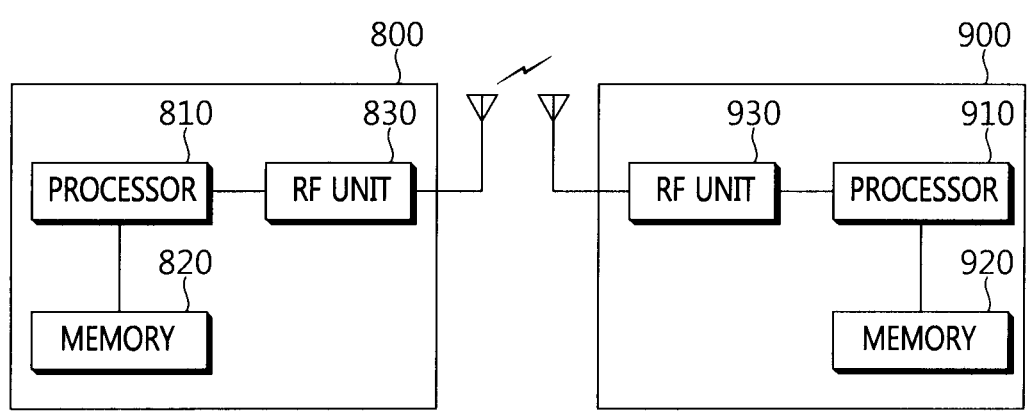
FIG. 11 is a block diagram showing wireless communication system to implement an embodiment of the present invention.

FIG. 11 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting, by a cooperative device, data through client cooperation in a wireless communication system, the method comprising:

receiving, by the cooperative device, uplink (UL) data included in a first transmission format from a source device operated with the cooperative device through a first communication system, determining, by the cooperative device, whether or not the UL data is data to be transmitted to a base station operated with the cooperative device through a second communication system based on a destination address field included in the first transmission format, and transmitting, by the cooperative device, the UL data to the base station based on a second transmission format when the UL data is data to be transmitted to the base station, wherein the first transmission format supports the first communication system and the UL data is transmitted via a frame body field included in the first transmission format based on encapsulating, wherein the second transmission format supports the second communication system and the UL data is transmitted via a frame body field included in the second transmission format, wherein the UL data is transmitted on an uplink resource based on the second transmission format, and wherein the uplink resource is determined based on an identifier newly assigned to the cooperative device by the base station for the client cooperation.

2. The method of claim 1, wherein the destination address field includes an identifier of the base station when the UL data is data to be transmitted to the base station, and wherein the identifier for the cooperative device is mapped to a plurality of source devices including the source device for cooperative communications with cooperative device.

3. The method of claim 1, wherein the destination address field includes a predetermined value for identifying the base station when the UL data is transmitted to the base station via the cooperative device.

4. The method of claim 1, wherein the second transmission format includes an identifier of the source device.

5. The method of claim 1, wherein a device operated as the cooperative device determines a possibility of the operation as the cooperative device before the operation as the cooperative device based on the information on a moving speed of the device, a location of the device, a presence and a number of each of surrounding devices having a possibility for an operation as a cooperative device, amount of power consumption for the client cooperation and a channel status between the device and the base station, wherein the device transmits information for performing multi-radio access technology (RAT) client cooperation to the source device before the operation as the cooperative device when the device determines the operation as the cooperative device, and wherein the information for performing multi-RAT client cooperation includes information on whether the device is a multi-RAT device or not, the possibility of the operation as the cooperative device and access communication systems of the device.

6. The method of claim 1, receiving, by the device, a ranging request message based on the first transmission format before the operation as the cooperative device to check an acceptance of the operation as the cooperative device, receiving, by the device operated as the cooperative device, information on uplink resource allocated by the base station to transmit the ranging request message when the device determines the operation as the cooperative device, transmitting, by the device operated as the cooperative device, the ranging request message based on the second transmission format on the uplink resource, receiving, by the device operated as the cooperative device, a ranging response message as a response of the ranging request message based on the second transmission format from the base station, and transmitting, by the device operated as the cooperative device, the ranging response message encapsulated in a frame body based on the first transmission format to the source device to announce the acceptance of the operation as the cooperative device.

7. A method of transmitting, by a cooperative device, data through client cooperation in a wireless communication system, the method comprising:

receiving, by the cooperative device, downlink (DL) data included in a second transmission format from a base station operated with the cooperative device through a second communication system, determining, by the cooperative device, whether or not the DL data is data to be transmitted to a source device operated with the cooperative device through a first communication system based on a destination address field included in the second transmission format, and transmitting, by the cooperative device, the DL data based on a first transmission format to the source device when the DL data is data to be transmitted to the source device, wherein the first transmission format supports the first communication system and the DL data is transmitted via a frame body field included in the first transmission format based on encapsulating, wherein the second transmission format supports the second communication system and the DL data is transmitted via a frame body field included in the second transmission format, wherein the DL data is transmitted on a downlink resource based on the second transmission format, and wherein the downlink resource is determined based on an identifier newly assigned to the cooperative device by the base station for the client cooperation.

8. The method of claim 7, wherein the first transmission format includes a source address field, wherein the source address field includes a predetermined value for identifying the base station when the DL data is transmitted by the base station, and wherein the identifier for the cooperative device is mapped to a plurality of source devices including the source device for cooperative communications with cooperative device.

9. The method of claim 7, wherein a device operated as the cooperative device determines a possibility of the operation as the cooperative device before the operation as the cooperative device based on the information on a moving speed of the device, a location of the device, a presence and a number of each of surrounding devices having a possibility for an operation as a cooperative device, amount of power consumption for the client cooperation and a channel status between the device and the base station, wherein the device transmits information for performing multi-radio access technology (RAT) client cooperation to the source device before the operation as the cooperative device when the device determines the operation as the cooperative device, and wherein the information for performing multi-RAT client cooperation includes information on whether the device is a multi-RAT device or not, the possibility of the operation as the cooperative device and access communication systems of the device.

10. The method of claim 7, receiving, by the device, a ranging request message based on the first transmission format before the operation as the cooperative device to check an acceptance of the operation as the cooperative device, receiving, by the device operated as the cooperative device, information on uplink resource allocated by the base station to transmit the ranging request message when the device determines the operation as the cooperative device, transmitting, by the device operated as the cooperative device, the ranging request message based on the second transmission format on the uplink resource, receiving, by the device operated as the cooperative device, a ranging response message as a response of the ranging request message based on the second transmission format from the base station, and transmitting, by the device operated as the cooperative device, the ranging response message encapsulated in a frame body based on the first transmission format to the source device to announce the acceptance of the operation as the cooperative device.

* * * * *